United States Patent [19]

Israelson

[11] Patent Number: 5,548,934
[45] Date of Patent: Aug. 27, 1996

[54] FIRESTOP APPARATUS FOR ALLOWING PIPE MOVEMENT

[75] Inventor: Ronald J. Israelson, St. Paul, Minn.

[73] Assignee: Minnesota Mining and Manufacturing Company, Saint Paul, Minn.

[21] Appl. No.: 301,248

[22] Filed: Sep. 6, 1994

[51] Int. Cl.[6] .................................................. E04C 2/52
[52] U.S. Cl. ................................ 52/220.8; 52/232; 52/1; 52/317
[58] Field of Search ........................... 52/220.8, 232–317

[56]  References Cited

U.S. PATENT DOCUMENTS

| | | |
|---|---|---|
| 4,061,344 | 12/1977 | Bradley et al. . |
| 4,086,736 | 5/1978 | Landrigan ........................... 52/220.8 |
| 4,109,423 | 8/1978 | Perrain . |
| 4,136,707 | 1/1979 | Gaillot et al. . |
| 4,221,092 | 9/1980 | Johnson . |
| 4,363,199 | 12/1982 | Kucheria et al. . |
| 4,467,577 | 8/1984 | Licht . |
| 4,538,389 | 9/1985 | Heinen . |
| 4,559,745 | 12/1985 | Wexler . |
| 4,669,759 | 6/1987 | Harbeke . |
| 4,848,043 | 7/1989 | Harbeke . |
| 4,850,385 | 7/1989 | Harbeke . |
| 4,894,966 | 1/1990 | Bailey et al. ....................... 52/220.8 X |
| 4,916,800 | 4/1990 | Harbeke . |
| 4,951,442 | 8/1990 | Harbeke, Jr. . |
| 4,952,615 | 8/1990 | Welna . |
| 5,058,341 | 10/1991 | Harbeke, Jr. . |
| 5,059,637 | 10/1991 | Langer . |
| 5,103,609 | 4/1992 | Thoreson et al. . |
| 5,129,201 | 7/1992 | Robertson et al. . |
| 5,155,957 | 10/1992 | Robertson et al. . |
| 5,174,077 | 12/1992 | Murota . |

FOREIGN PATENT DOCUMENTS

0486299A1 5/1992 European Pat. Off. .

WO91/19540 12/1991 WIPO .

OTHER PUBLICATIONS

One page sheet entitled "Pentration Forestop For Max. 3" Dia. Insulated Metal Pipe Through a Concrete Wall from 3M, dated Apr. 1, 1992.
One page sheet entitled "SPEC–DATA—Fireproofing"–Foam Penetration Seal & Fire Stop by Dow Corning Corporation, Nov., 1984.

Primary Examiner—Carl D. Friedman
Assistant Examiner—Christopher Todd Kent
Attorney, Agent, or Firm—Gary L. Griswold; Walter N. Kirn; James J. Trussell

[57]  ABSTRACT

A firestop apparatus that allows substantial longitudinal and radial movement of a pipe that extends through an opening in a partition. The firestop includes a thermal insulator assembly that surround the pipe, is positioned to slidably engage with a surface of the partition, and is sized to substantially cover the opening even when the pipe is moved to the edge of the opening. A first seal is interposed between the insulator and the pipe to permit longitudinal movement of the pipe through the insulator. A second seal is interposed between the insulator and the partition to permit radial movement of the pipe and insulator relative to the opening. A securing structure allows radial movement of the insulator relative to the opening while maintaining engagement of the insulator against the side of the partition. The insulator assembly can include an outer plate that engages with the securing structure to provide structure to the insulator during a fire and to resist wear due to relative movement between the insulator and the securing structure. The insulator assembly also can include an inner plate to protect the insulator from damage due to movement against the partition. A slider member may be interposed between the insulator and the first seal to facilitate longitudinal movement of the pipe through the insulator. Also disclosed is a method for sealing a pipe passing through an opening in a partition.

24 Claims, 4 Drawing Sheets

FIRESTOP APPARATUS FOR ALLOWING PIPE MOVEMENT

TECHNICAL FIELD

The present invention relates to a firestop apparatus, and specifically, to a penetration firestop that allows substantial axial and radial movement of a pipe relative to a partition.

BACKGROUND OF THE INVENTION

A firestop is a device that impedes the passage of smoke and flames through a wall or floor adjacent a pipe, conduit, duct, electrical cable or other structure. Building codes for commercial and residential structures often require the installation of a firestop capable of containing fire and smoke for a certain period of time. For example, FIG. 1 illustrates a pipe 10 that passes through wall 12 and floor 14 at locations A and B, respectively. If no firestop is provided, smoke and flames emanating from burning object 16 may pass into adjacent rooms through the gap between pipe 10 and wall 12 or floor 14.

Additionally, a pipe may move radially, axially, or both relative to the partition through which it extends due to thermal expansion and contraction, shifting of the structure, seismic activity, and other factors. Repeated movement of the pipe relative to the partition may compromise the integrity of a conventional firestop. For example, a pipe has a certain equilibrium length at room temperature. If heated water is forced through the pipe (such as water from a boiler), the pipe will tend to expand both longitudinally and radially. When the pipe is cooled, it will tend to return to its equilibrium length. For example, a 30.5 meter (100.0 ft) section of cast iron pipe may expand 27.2 mm (1.1 inches) if heated from an ambient temperature of 42.2° C. (60° F.) to 202° C. (220° F.). A similar length of copper pipe may expand 44.7 mm (1.76 inches). In a fire, temperatures may reach 927° C. (1700° F.) resulting in linear expansion of 276.9 mm (10.9 inches) for a 30.5 meter (100.0 ft) section of cast iron pipe and 457.2 mm (18.0 inches) for copper pipe. If the pipe has an elbow, such as the pipe shown in FIG. 1, the pipe may undergo longitudinal expansion in two directions, labelled D1 and D2 in FIG. 1. Thus, it is desirable for a firestop to permit repeated axial and radial movement of a pipe due to thermal expansion, for example, without degrading the structural integrity of the fire stop.

One known firestop includes caulk, putty, or the like packed around the perimeter of the pipe at the junction between the pipe and the partition. Such a firestop may have utility from the standpoint of impeding the passage of smoke, but may not be suitable for environments in which the pipe moves substantially relative to the partition, due in part to different thermal expansion coefficients for the pipe, the caulk, and the wall. Furthermore, the caulk may dry and crack over time, thereby losing effectiveness as a firestop. Most importantly, the caulk typically can accommodate pipe movement of less than 12 mm (0.5 inches). Consequently, the caulk may become separated from the pipe or the partition or both after a sufficient number of expansion and contraction cycles, compromising the effectiveness of the firestop.

Another known firestop is illustrated in FIG. 2, wherein pipe 10' passes through wall 12'. The firestop 20 may be applied on one or both sides of wall 12', and generally includes a flexible boot 22 circumferentially attached to pipe 10' by band clamp 24. The other end of flexible boot 22 is attached to wall 12' by wall ring 26. Flexible boot 22 is typically provided with a fire-proof or fire-resistant layer 28 facing pipe 10', to shield pipe 10' from fire near the opening in wall 12'. Fire-proof layer 28 may comprise such materials as fiberglass or a mat constructed of ceramic insulation materials.

While having its own utility, the firestop illustrated in FIG. 2 may exhibit certain disadvantages. For example, the fire-proof layer 28 may tend to deteriorate after many expansion and contraction cycles. Similarly, the flexible boot may also deteriorate after many expansion and contraction cycles, which could compromise the effectiveness of the firestop. Moreover, depending on the characteristics of the particular firestop, the flexible boot 22 may not have the capacity to accommodate extreme movement of the pipe 10' due to extreme thermal expansion of the pipe during a fire.

It is therefore desirable to provide a firestop that accommodates movement of pipe with respect to a partition that remains effective after many expansion and contraction cycles.

SUMMARY OF THE INVENTION

The present invention is related to a penetration firestop that permits both axial and radial movement of a pipe that passes through an opening in a partition.

A thermal insulator assembly of the present firestop generally surrounding the pipe is positioned to slidably engage with a first surface of the partition, to substantially cover the opening. The insulator preferably is sized such that the opening will be substantially covered even when the pipe is moved to the edge of the opening in the partition. A first seal is interposed between the insulator and the pipe, which permits longitudinal movement of the pipe through the insulator. A second seal is interposed between the insulator and the partition, which permits radial movement of the pipe and insulator relative to the opening. A securing structure is provided to allow radial movement of the insulator relative to the opening while generally maintaining engagement of the insulator against the first side of the partition.

The first and second seals preferably comprise an intumescent material that expands to enhance the sealing characteristics of the firestop apparatus when exposed to extreme heat.

In a preferred embodiment, the insulator assembly includes an outer plate that engages with the securing structure. The outer plate provides structure to the insulator during a fire event, and resists wear due to relative movement between the insulator and the securing structure. The insulator assembly also preferably includes an inner plate, to protect the insulator from damage due to movement against the partition. The inner plate preferably is constructed of a polymeric sheet or other durable material.

A slider member may be interposed between the insulator and the first seal to facilitate longitudinal movement of the pipe through the insulator. The slider member may also be constructed of a polymeric or other durable material.

The securing structure preferably includes a bearing plate with a perimeter, and a through hole approximately the size and shape of the opening in the partition. Spacers are provided proximate the perimeter of the bearing plate to retain the plate at a fixed distance from the partition approximately the thickness of the insulator assembly. The plate preferably is aligned so that the through hole is generally aligned with the opening in the partition. The insulator is interposed between the bearing plate and the partition such that the insulator can move radially relative to the opening, while being generally retained against the surface of the partition.

A gasket material may optionally be included to the firestop to prevent smoke from migrating past the penetration firestop before the intumescent seals have expanded. The gasket preferably is stretched around the first seal and the pipe and attached to the inner plate of the insulator assembly.

The present method for sealing a pipe passing through an opening in a partition includes the steps of attaching an insulator with a cross section larger than the opening to the pipe proximate the opening. A first seal is interposed between the insulator and the pipe and a second seal is interposed between the partition and the insulator. The insulator is secured to the partition to restrict longitudinal movement while allowing radial movement of the insulator relative to the opening so that the opening remains substantially covered at all times.

BRIEF DESCRIPTION OF THE DRAWINGS

The invention will be more readily understood with reference to the accompanying drawings, wherein like reference numerals refer to like components throughout the several views, and wherein.

DETAILED DESCRIPTION OF THE INVENTION

Figure 3:
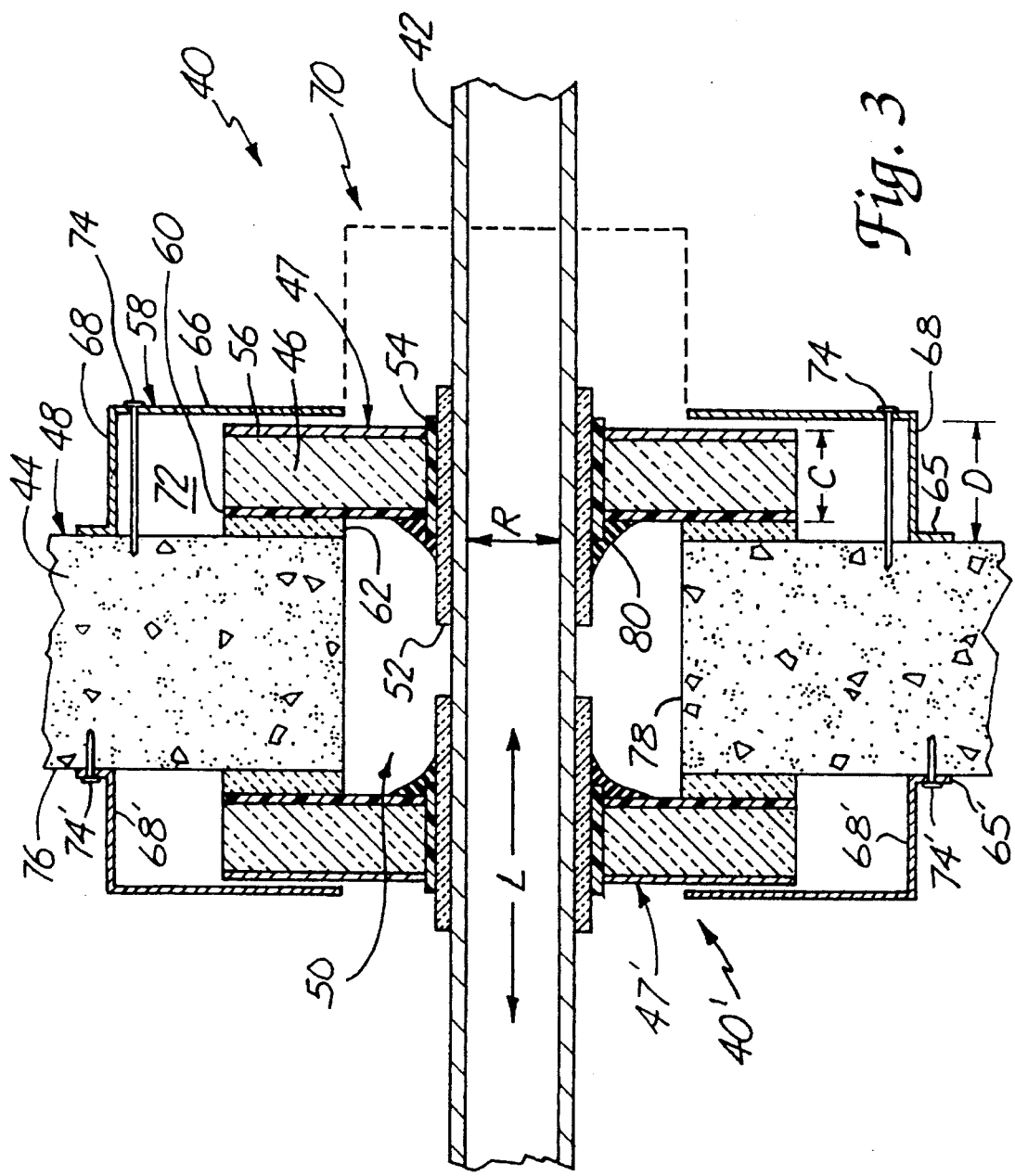
FIG. 3 is a side view of a preferred firestop apparatus of the present invention.

FIG. 3 illustrates a sectional view of a preferred penetration firestop 40 for allowing longitudinal movement along an axis "L" and radial movement along an axis "R" of pipe 42 through partition 44. The present penetration firestop 40 is intended for use with any mechanism that may compromise the fire resistance or integrity of a partition. As such, the term "pipe" encompasses rigid devices of various shapes and sizes that extend through a partition, such as pipes, conduits, electric cables, ducts, and the like. The term "partition" encompasses any divider that separates compartments in a structure, such as a wall, floor, ceiling, bulkhead, and the like.

An insulator assembly 47 radially surrounds the pipe 42 so that opening 50 remains substantially covered. A securing structure 58 with a bearing plate 66 retains the insulator assembly 47 against a first side 48 of the partition 44, while permitting radial movement of the insulator assembly 47. The securing structure 58 comprises a bearing plate 66 with a series of spacers 68 and 68' designed to retain the bearing plate 66 a fixed distance D from the first surface 48. The spacers 68 and 68' may either be integrally formed in the bearing plate 66 or attached thereto. The spacers may include tabs 65 and 65' directed either toward or away from the center of the bearing plate 66. The securing structure 58 is affixed to the partition 44 by conventional means, such as screws 74 and 74'. As illustrated in FIG. 3, radial movement of the insulator assembly 47 is limited by the screws 74, while radial movement of the insulator assembly 47' of firestop 40' is limited by the spacers 68'.

The insulator assembly 47 preferably has a thickness C that is slightly less than the distance D, so that the insulator assembly 47 can move freely within cavity 72. Most fire codes require that smoke not be allowed to migrate past the firestop 40. As will be discussed below, when exposed to high temperatures, the first and second seals 52 and 62 expand to form smoke seals. The present firestop 40 may also be used in combination with a smoke seal, such as rubber ring 80 discussed below, that contains the smoke until the intumescent material expands.

Figure 4:
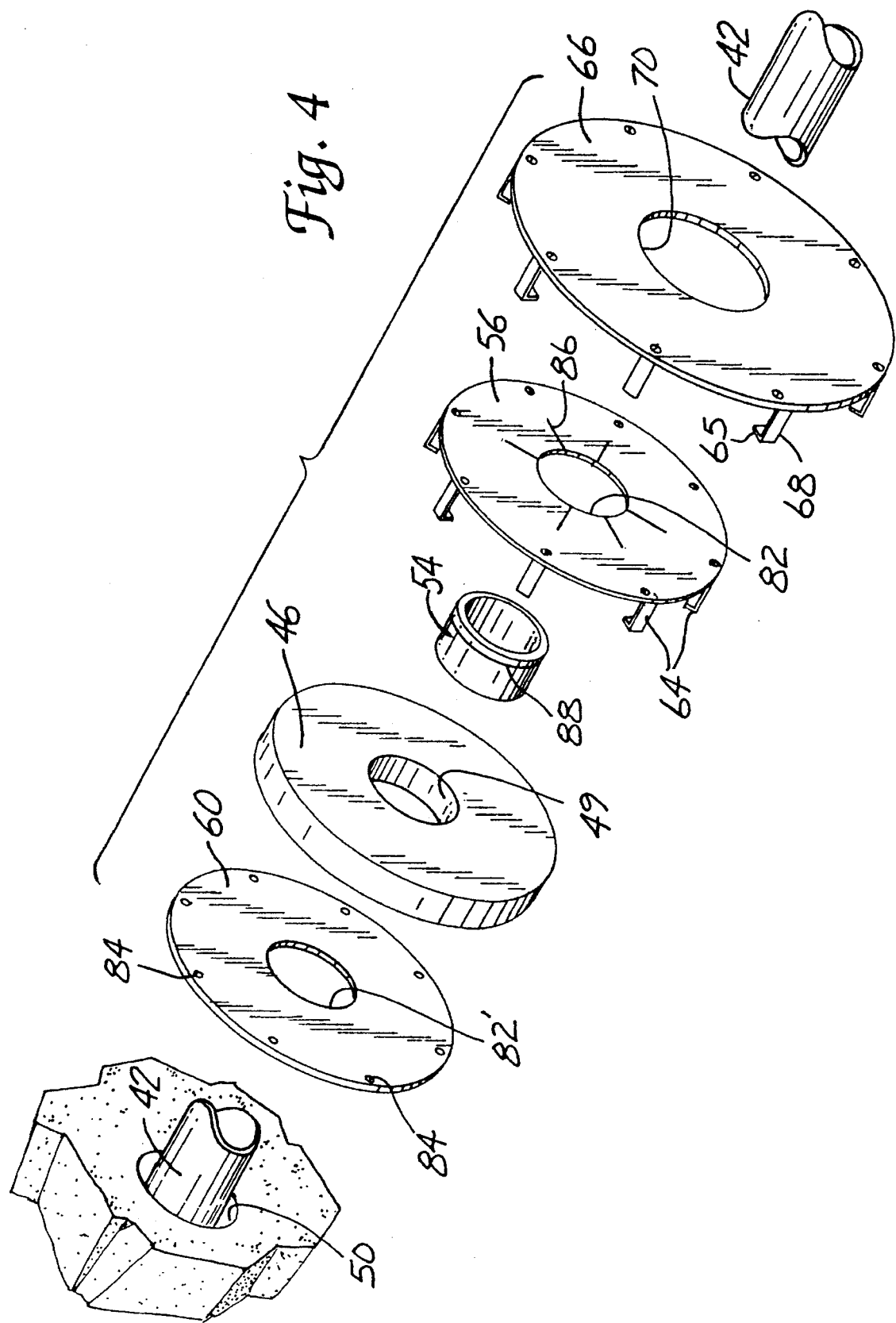
FIG. 4 is an exploded view of a preferred firestop apparatus of the present invention.

As illustrated in FIG. 4, the insulator assembly 47 preferably includes an annular thermal insulator 46 with an insulator opening 49, interposed between an inner plate 60 and an outer plate 56. The outer plate 56 and inner plate 60 both have pipe openings 82 and 82', respectively, which are generally concentric with the insulator opening 49. A series of slits 86 preferably are provided around the inner edge of the opening 82, to facilitate engagement of the outer plate 56 with a groove 88 on slider 54.

Spacers 64 are provided on the outer plate 56 to retain the inner plate 60 and thermal insulator 46 to the outer plate 56. The spacers 64 may either be integrally formed in the outer plate 56 or attached thereto. The thermal insulator 46 preferably is constructed of a ceramic blanket material. An insulator suitable for this purpose is commercially available under the trade name "FIBERFRAX Duraback Blanket" from Carborundum of Niagara Falls, N.Y. Alternatively, I-10A Series Intumescent Ceramic Fiber Mat available from Minnesota Mining and Manufacturing Company (3M), of St. Paul, Minn. may be suitable for this purpose, for which the technical specification, 3M document number 98-0400-0585-6(96.5)R1, is hereby incorporated by reference. The thermal insulator 46 may also be constructed of lower cost insulating materials, such as fiberglass or mineral wool, with a corresponding reduction in fire rating.

The inner and outer plates 60 and 56 may be constructed of any durable, wear resistant material available in sheet form, such as metal, polycarbonate, polypropylene, polytetrafluoroethylene, acrylonitrilebutadienestyrene (ABS), or polyvinylchloride (PVC). Typically, it is preferred to use a non-conductive material for the inner plate 60 so that it does not conduct heat during a fire. Sheet stock of ABS or PVC suitable for this purpose is available from McMaster-Carr Supply Co. of Chicago, Ill., and typically ranges in thickness from 3.2 mm (0.125") to 25.4 mm (1.0 inch). Galvanized steel also has been shown to reinforce the thermal insulator 46 during a fire and to resist wear due to movement against the bearing plate 66. It will be understood that the size and shape of the plates 56, 60 may vary with the shape of the opening 50, the cross-sectional shape of the pipe 42, and other application parameters.

Returning to FIG. 3, a first seal 52 is wrapped around the pipe 42 proximate the insulator assembly 47. A slider member 54 may be interposed between the first seal 52 and the insulator assembly 47 to facilitate longitudinal movement of the pipe 42 along the axis "L". In a preferred embodiment, the first seal 52 is attached to the pipe 42. Alternatively, the first seal 52 may be attached to the slider member 54, or may itself be the slider member. In some applications, the slider member 54 may be eliminated from the fire stop 40. If the slider member 54 is removed, it may be desirable to place a low-friction material, such as polycarbonate, polypropylene, polytetrafluoroethylene, acrylonitrilebutadienestyrene (ABS), or polyvinylchloride (PVC) between the seal 54 and the pipe 42.

A second seal 62 is interposed between the inner plate 60 and the first surface 48 of the partition 44. The inner plate 60 facilitates sliding of the insulator assembly 47 on the second seal 62. In a preferred embodiment, the second seal 62 is adhered to the first surface 48 of the partition 44.

The first and second seals 52 and 62 preferably are constructed of an intumescent sheet material that expands into low density insulation blankets when exposed to elevated temperatures. Intumescent sheet material useful for the practice of this invention typically comprise polymeric binders, fillers, and intumescent particles. Suitable intumescent particles include silicates, expanding graphite, and vermiculite. Typically, such a mixture is compounded with sufficient additives to make a sheet that has suitable expansion, flexibility, and handling characteristics and so can be conveniently wrapped around a pipe. When subjected to heat or flames, the sheet material expands to form a seal that acts as a barrier to heat, smoke, and flames, as well as locking the firestop 40 in place. Preferably, the intumescent sheet material is laminated to a restraining layer, such as a metal (preferably aluminum) foil, to control the direction of the expansion of the intumescent sheet, and to reduce friction to facilitate movement. Other materials useful as restraining layers include metal screen, paper, cardboard, and rubber or plastic sheets, as described in U.S. Pat. No. 4,467,577 (Licht), the contents of which is incorporated by reference.

A preferred intumescent sheet is available under the designation "INTERAM I-10A" as described above. The "INTERAM I-10A" intumescent sheet material is approximately 5.02 mm (0.198") thick and is laminated to aluminum foil that is 0.076 mm (0.003") thick. Consequently, when the present penetration firestop 40 is exposed to high temperature, the first and second seals 52 and 62 expand to form a tight seal with the pipe 42 and partition 44 against both smoke and fire.

The securing structure 58 preferably has a through-hole 70 that is approximately the same size and shape as the opening 50 in the partition 44. The through-hole 70 permits the pipe 42 to move within the opening 50 without being obstructed by the securing structure 58. Alternatively, the through-hole 70 can be smaller than the opening 50 to prevent the pipe 42 from contacting inner wall 78 of the opening 50, thereby restricting movement of the pipe 42 by a predetermined amount. In one embodiment, the insulator assembly 47 moves within the cavity 72 formed by the securing structure 58 within the limits set by the dimensions of the opening 50 or through-hole 70 or both. The insulator assembly 47 preferably covers the opening 50 even if the pipe 42 moves to the inner wall 78 of the opening 50.

An optional rubber ring 80 may be included on the inner surface of the insulator assembly 47 to prevent the migration of smoke prior to expansion of the seals 52 and 62. The rubber ring 80 preferably is attached to the inner plate 60 of the insulator assembly 47, and to the first seal 52. The inner diameter of the rubber ring 80 preferably is slightly less than the diameter of the first seal 52 around the pipe 42. This "stretch" fit of the seal 80 provides a smoke seal for the firestop 40 in the absence of elevated temperatures. The rubber ring 80 may be constructed from commercial grade neoprene sheet material 0.79 mm (0.0313 inches) thick, which is available from McMaster Carr Supply Co. of St. Paul, Minn. under stock number 9455K31.

In some circumstances it may be desirable to provide a penetration firestop on both sides of a partition to minimize the chance of fire spreading from either side of the partition to another. FIG. 3 illustrates such a second penetration firestop 40' on the second side 76 of the partition 44.

As illustrated in FIG. 4, the through-hole 70 in the bearing plate 66 preferably is the same shape and size of the opening 50 in the partition 44. Although the present embodiment illustrates a generally circular through-hole 70 and pipe 42, those skilled in the art will understand that the present invention is not limited by the shape of the through-hole 70, the opening 50 or the pipe 42. For example, the through-hole 70 can be square to accommodate a square duct and a square opening in the partition. It is contemplated that the present penetration firestop 40 is suitable for use with any pipe, conduit, heating and air conditioning duct, electrical cable, and other mechanism that may compromise the integrity and fire resistance of a partition.

Figure 5:
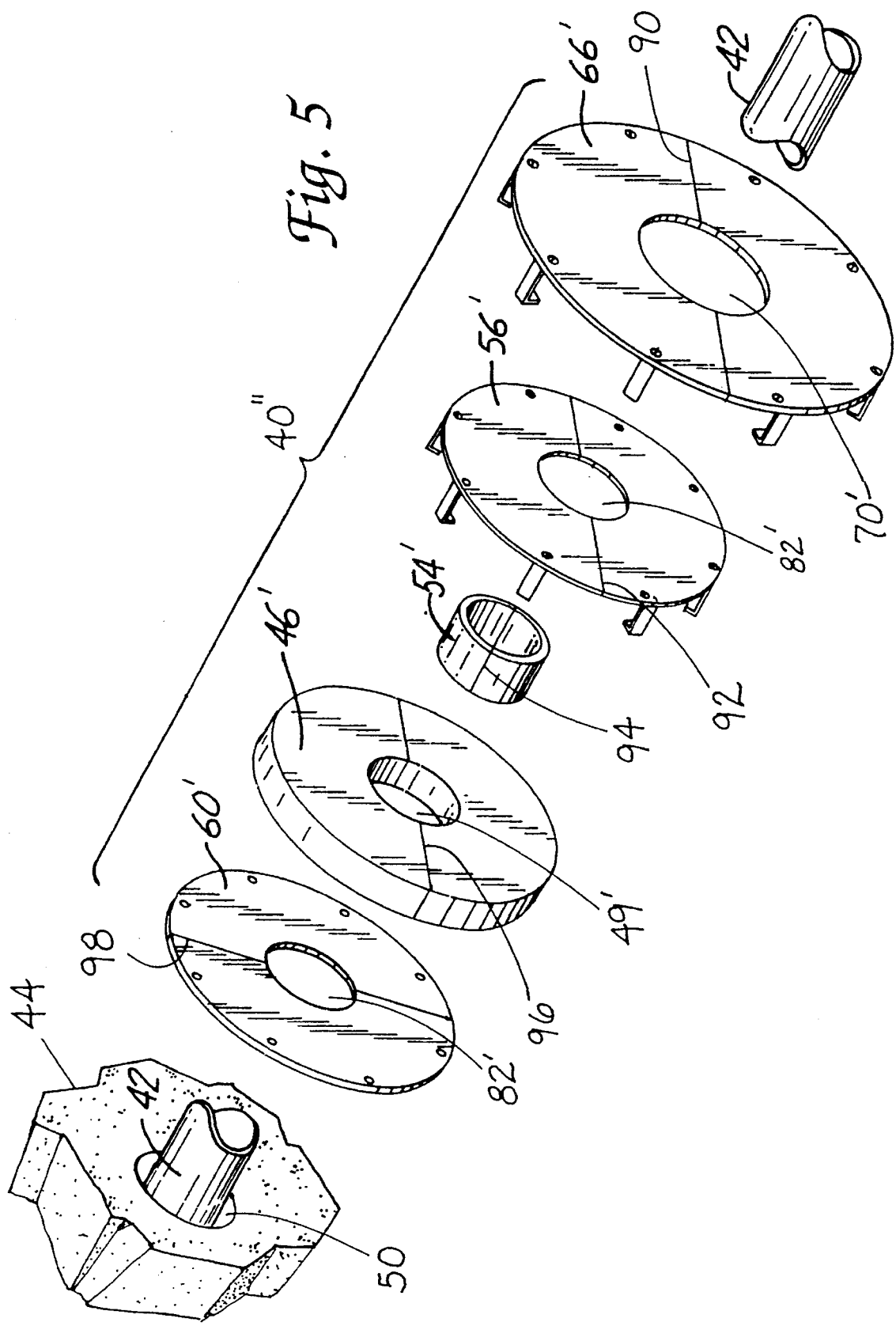
FIG. 5 is an exploded view of an alternate firestop apparatus of the present invention.

FIG. 5 is an alternate embodiment of the penetration firestop 40" that can be retrofit to existing structures that can not be disassembled to allow the components to be slid onto the pipe. The securing structure 66' preferably is cut into two separate parts along an axis 90. The securing structure 66' can be joined together when attached to the partition 44. Likewise, the outer plate 56', slider 54', insulator 46', and inner plates 60' are cut into two separate pieces along the axes 92, 94, 96, and 98, respectively. The axes 90–98 can be located anywhere that will allow the components to engage with the pipe 42. Alternatively, the axes 90–98 may comprise a single cut from the outside edge to the center of the components 66', 56', 54', 46', 60', respectively, where it is possible to deform the components sufficiently to engage with the pipe 42. The insulator assembly will have greater strength if the axes 92 and 98 are not co-planar.

EXAMPLE

The bearing plate as depicted at 56 of FIG. 4 was constructed of galvanized steel sheet stock (20 gauge, 0.036", 0.66 mm, commercially available from Fullerton Metals Co., of Minneapolis, Minn.) cut into a 355.6 mm (14.0") circle having 8 equally spaced tabs (12.7 mm by 63.5 mm; 0.5" wide by 2.5" long) extending radially from the outer edge of the circle. A 152.4 mm (6.0") diameter circle was cut from the center. At the end of each tab, a 5.89 mm (0.232") diameter hole was drilled; a 5.89 mm (0.232") diameter hole was drilled at the radius of the circle (centered at 6.35 mm (0.25") from the edge of the circle) in alignment with each tab. The tabs at the edge of the sheet were bent 90° relative to the sheet, and the last 0.5" of the tabs were bent 90°, as depicted in FIG. 4. The tabs thus formed spacers corresponding generally to items 68 in FIGS. 3 and 4.

The outer plate as depicted at 56 of FIG. 4 was constructed from galvanized steel sheet stock (20 gauge, 0.036", 0.66 mm commercially available from Fullerton Metals Co., of Minneapolis, Minn.) cut into a 254 mm (10.0") diameter circle having 8 equally spaced 50.8 mm (2.0") long tabs (12.7 mm (0.5") wide) extending radially from the outer edge of the circle. A 80.64 mm (3.175") diameter circle was cut from the center of the sheet. Six 25.4 mm (1.0") long slits were cut into the metal at evenly spaced intervals radially at the edge of the inside circle. The slits allowed for some deformation of the metal of the outer plate when fitted with the slider member.

A slider member (depicted as 54 in FIG. 4) was cut from a 76.2 mm (3.0") inner diameter and 81.02 mm (3.19") outer diameter piece of rigid ABS tubing (commercially available from McMaster-Carr Supply Co. of Chicago, Ill.). The slider member was 50.8 mm (2.0") long, and grooved 0.508 mm (0.02") deep at 7.94 mm (0.3125") from one end. The groove corresponds to the groove 88 as depicted in FIG. 4.

The inner plate (depicted as 60 in FIG. 4) was cut from sheet stock of 3.17 mm (0.125") ABS (commercially available from McMaster-Carr Supply Co.) into a 254 mm (10.0") diameter circle. An inner circle 82' having a diameter of 80.64 mm (3.175") was cut from the center. Eight 6.35 mm (0.25") holes 84 were drilled at equally spaced intervals around the edge of the inner plate 60 to accept #4 flat head sheet metal screws.

The insulator was cut from a 25.4 mm (1.0") thick blanket of ceramic fiber insulation into two 254 mm (10.0") diameter circles having a 76.2 mm (3.0") diameter circle cut out of the middle. The insulator is shown as item 46 in FIG. 4. The two rings of insulators were stacked to form a 50.8 mm (2.0") thick layer. The insulator was obtained under the tradename "FIBERFRAX Duraback Blanket" from Carborundum of Niagara Falls, N.Y.

To assemble the apparatus for a fire test, the slider member was fitted into the outer plate until the inner opening locked into the groove in the slider member. The insulator was fitted over the slider member and compressed between the plate and the outer plate. The inner plate was screwed onto the spacers on the outer plate to hold the assembly together.

A 91.4 cm (3.0') square poured concrete block simulated a floor for the purposes of the fire test. The floor block was 11.43 cm (4.5 inches) thick and had a 15.24 cm (6.0 inch) diameter circular opening centered in the block. On both sides of the concrete block, around the area of the opening, a 254 mm (10.0") outer diameter, 152.4 mm (6.0") inner diameter ring of intumescent sheet ("INTERAM I-10A") was attached to the block with a spray adhesive (commercially available as Super 77 Spray Adhesive from Minnesota Mining and Manufacturing Company (3M) of St. Paul, Minn.). The aluminum foil side of the intumescent sheet faced outward from the block. A 914.4 mm (36.0") long piece of steel pipe (60.32 mm (2.375") OD, commercially available from Capitol Supply Co. of St. Paul, Minn., having the designation "2 inch schedule 40") was wrapped with a single layer of intumescent sheet ("INTERAM I-10A") and held in place by aluminum foil tape (having the trade designation "T-49", commercially available from Minnesota Mining and Manufacturing Company (3M)). The intumescent sheet was centered inside the firestop assembly and extended approximately 88.9 mm (3.5") on either side of the concrete. The pipe, wrapped with intumescent sheet, was positioned through the opening in the concrete block.

A sheet of neoprene rubber (0.8 mm (0.031") sheet available from McMaster Carr Co.) was cut into a 177.8 mm (7.0") diameter ring having a 63.5 mm (2.5") diameter hole at the center. This was centered over the opening in the inner/outer plate assembly and secured to the inside surface using duct tape. The rubber sheet was in compression with the intumescent mat and therefore provided a cold smoke seal to the device.

The slider member, inner plate, and outer plate were fitted onto the pipe and placed in contact with the intumescent sheet on the face of the concrete block. An identically prepared assembly was placed on the pipe on the other side of the block. The pipe was checked to see that the pipe was still relatively free to move (radially and longitudinally).

The bearing plate (corresponding to 66 in FIG. 4) was positioned over the pipe in the concrete block, centered over the opening and then fastened down into the concrete by screwing in 63.5 mm (2.5") long, 6.35 mm (0.25") diameter concrete anchor screws.

To perform the fire test, the assembly, mounted on the concrete block, was mounted on top of a 0.19 m$^3$ (7 ft$^3$) gas fired furnace (commercially available as a kiln from Olympic Kilns of Atlanta, Ga.) with a firestop assembly on each side of the concrete block. The end of the pipe inside the furnace was sealed off by a 6.35 mm (0.25") thick steel plate which was welded to the pipe.

The temperature was monitored with thermocouples ("K" type thermocouples with 6.35 mm (0.25") diameter steel sheaths) mounted at various locations on the inside top of the furnace. Eight thermocouples (unsheathed) were used to record temperatures at various locations on the firestop assembly. These thermocouples were covered with a 3 mm (0.125") thick ceramic fiber insulating pad and mechanically held into place with fiber reinforced tape, steel wire, or fire bricks.

Figure 1:
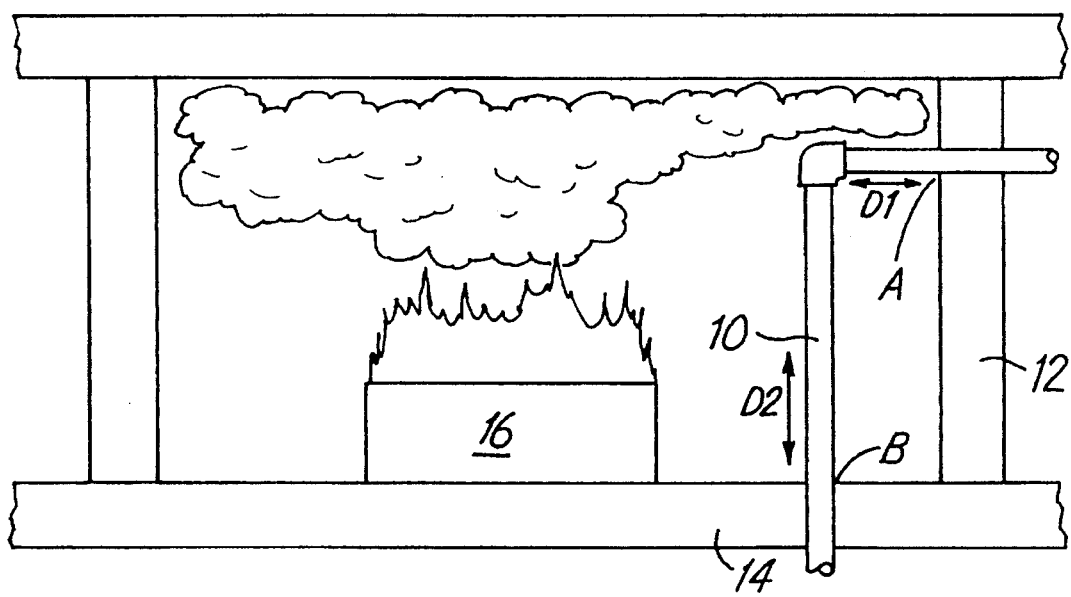
FIG. 1 is a schematic illustration of a pipe extending through a wall and a floor of a structure.
Figure 2:
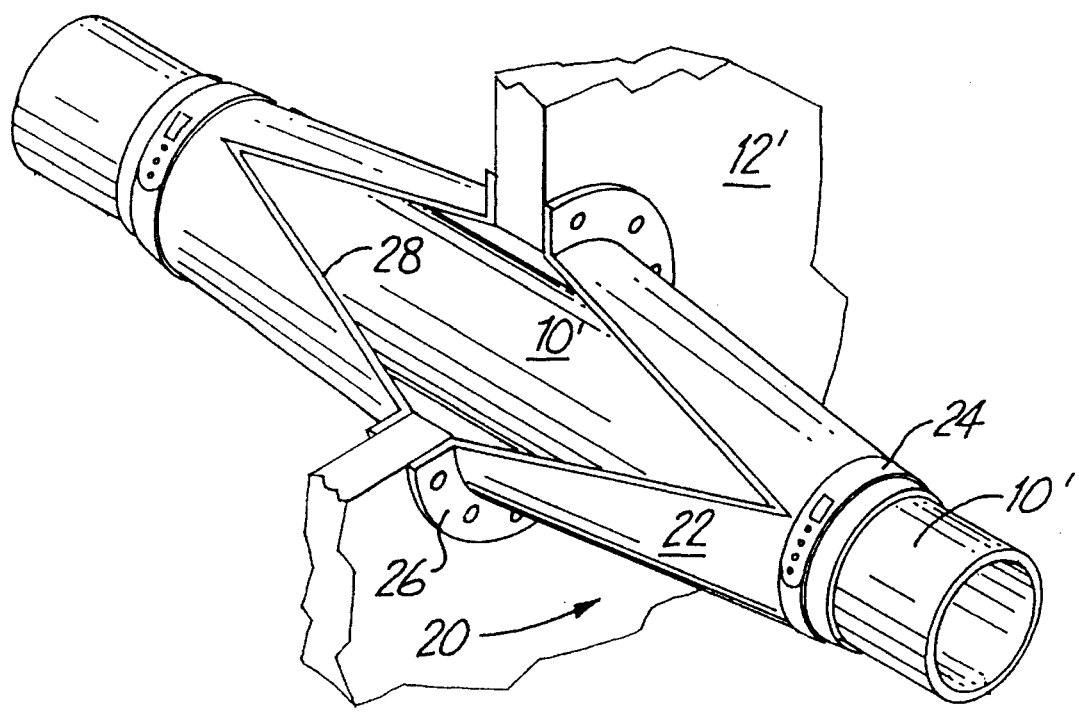
FIG. 2 is a perspective cut-away view of a conventional firestop.

The apparatus was subjected to a two part fire test. The fire exposure portion of the test evaluated the resistance of the firestop assembly to a fire. The time and temperature parameters outlined in FIG. 1 of ASTM (American Society for Testing Materials) E814-83, entitled Fire Tests of Through-Penetration Fire Stops, the contents of which are hereby incorporated by reference, were followed for the test. The first part of the test established "F" and "T" ratings. An "F" rating occurs at the time at which flames pass through the apparatus. A "T" rating occurs at the time when the temperature on the unexposed side of the apparatus reaches 163° C. (325° F.) higher than its initial temperature. To obtain either rating, the apparatus must maintain its seals during a high pressure water spray, as described below. If a firestop assembly allowed flames to pass through the pipe from the hot side of the slab to the cold side of the slab, that firestop assembly fails the fire exposure portion of the test.

The second part of the test of each firestop assembly was conducted immediately following the conclusion of the fire exposure part. The hose stream portion of the test evaluated the resistance of the firestop to a stream of water propelled against the firestop at a pressure of 0.21 MPa (30 lbs/in$^2$). The firestop assembly must have withstood the water and continued to seal the pipe for a period of 1.5 seconds per square foot of test structure. For example, 13.5 seconds for a 3 foot by 3 foot concrete slab. This test is further described in ASTM E814-83, the contents of which were previously incorporated by reference. The present firestop apparatus achieved a 3 hour "F" and "T" rating per the ASTM E-814-83 standard.

The present invention has now been described with reference to several embodiments thereof. It will be apparent to those skilled in the art that many changes can be made in the embodiments described without departing from the scope of the invention. Thus, the scope of the present invention should not be limited to the structures described herein, but only by structures described by the language of the claims and the equivalents of those structures.

What is claimed is:

1. A penetration firestop that permits longitudinal and radial movement of a pipe through an opening in a partition where the opening has a cross-sectional area larger than a cross-sectional area of the pipe, said firestop comprising:

a) a thermal insulator adapted to generally surround the pipe and to be slidably engaged with a first side of the partition, said thermal insulator dimensioned to substantially cover the opening;

b) a first seal adapted to be interposed between said thermal insulator and the pipe, said first seal adapted to permit longitudinal movement of the pipe through said insulator;

c) a second seal adapted to be interposed between said thermal insulator and the partition, said second seal adapted to permit radial movement of the pipe and said insulator relative to the opening; and d) securing means for allowing radial movement of said insulator relative to the opening while generally maintaining engagement of said insulator to the first side of the partition so that the opening remains substantially covered during movement of the pipe.

2. The apparatus of claim 1 wherein said thermal insulator further includes an outer plate interposed between said insulator and said securing means.

3. The apparatus of claim 2 wherein said outer plate comprises steel.

4. The apparatus of claim 1 wherein said insulator further includes an inner plate adapted to be interposed between said insulator and the partition.

5. The apparatus of claim 4 wherein said inner plate is composed from a material selected from a group consisting of metal, polycarbonate, polypropylene, polytetrafluoroethylene, acrylonitrilebutadienestyrene, and polyvinylchloride.

6. The apparatus of claim 1 wherein said insulator further includes a slider member interposed between said insulator and said first seal to enhance longitudinal movement of the pipe through said insulator.

7. The apparatus of claim 6 wherein said slide member is composed from a material selected from a group consisting of metal, polycarbonate, polypropylene, polytetrafluoroethylene, acrylonitrilebutadienestyrene, or polyvinylchloride.

8. The apparatus of claim 1 wherein said insulator is dimensioned to substantially cover the opening when the pipe is adjacent to any edge of the opening.

9. The apparatus of claim 1 wherein said first and second seals comprise an intumescent material.

10. The apparatus of claim 1 wherein said first seal is attached to said insulator.

11. The apparatus of claim 1 wherein said second seal is adapted to be attached to the partition.

12. The apparatus of claim 1 wherein said insulator comprises a blanket of compressed ceramic fibers.

13. The apparatus of claim 1 wherein said insulator comprises a cylindrical shape with a pipe opening adapted for receiving the pipe.

14. The apparatus of claim 1 wherein said securing means comprises a bearing plate with a perimeter and through-hole dimensioned to have a diameter approximately the diameter of the opening in the partition, said through-hole adapted to be generally concentric with the opening in the partition, and said bearing plate further comprising spacer portions proximate said perimeter adapted for retaining said bearing plate a fixed distance from the partition, wherein said insulator is adapted to be interposed between said bearing plate and the partition.

15. The apparatus of claim 1 wherein said securing means comprises a bearing plate with a perimeter and a through-hole which is dimensioned to have a diameter that is less than the diameter of the opening in the partition, said through-hole adapted to be generally concentric with the opening in the partition, and said bearing plate further comprising spacer portions proximate said perimeter adapted for retaining said bearing plate a fixed distance from the partition, wherein said insulator is adapted to be interposed between said bearing plate and the partition.

16. The apparatus of claim 1 wherein said apparatus is adapted for use with a partition having a generally cylindrical opening.

17. The apparatus of claim 1 wherein said apparatus is adapted for use with a generally cylindrical pipe.

18. The apparatus of claim 1 wherein said apparatus is adapted for use with a partition that is a wall structure.

19. The apparatus of claim 1 wherein said apparatus is adapted for use with a partition that is a ceiling structure.

20. The apparatus of claim 1 wherein said insulator has an inner surface and an outer surface, said insulator further including a gasket attached to said inner surface and extending around said first seal.

21. The apparatus of claim 20 wherein said gasket comprises a rubber material.

22. The apparatus of claim 1 wherein said apparatus is adapted for use with a pipe that comprises a metal or ceramic material.

23. A penetration firestop that permits both longitudinal and radial movement of a pipe through an opening in a partition where the opening has a cross-sectional area larger than a cross-sectional area of the pipe, said penetration firestop comprising:

(a) a thermal insulator with a cross-sectional area dimensioned to be larger than the opening and adapted to substantially surround the pipe;

(b) a first seal adapted to be interposed between said insulator and the pipe, said first seal adapted to permit longitudinal movement of the pipe through said insulator;

(c) a second seal adapted to be interposed between said insulator and the partition, said second seal adapted to permit radial movement of the pipe and said insulator relative to the opening; and (d) securing means for allowing radial movement and for restricting longitudinal movement of said insulator relative to the opening so that the opening remains substantially covered.

24. A method for sealing a pipe that extends through an opening in a partition, to minimize the migration of fire or smoke from one side of the partition to another, comprising the steps of:

a) attaching a thermal insulator with a cross-sectional area larger than the opening to the pipe proximate the opening;

b) interposing a first seal between the thermal insulator and the pipe, the first seal permitting longitudinal movement of the pipe through the thermal insulator;

c) interposing a second seal between the thermal insulator and the partition, the second seal permitting radial movement of the pipe and thermal insulator relative to the opening; and d) securing the thermal insulator to the partition to restricting longitudinal movement while allowing radial movement of the thermal insulator relative to the opening so that the opening remains substantially covered.

* * * * *